United States Patent
Zhao et al.

(10) Patent No.: US 10,779,148 B2
(45) Date of Patent: Sep. 15, 2020

(54) DATA TRANSMISSION METHOD AND FIRST ELECTRONIC DEVICE

(71) Applicants: BEIJING LENOVO SOFTWARE LTD., Beijing (CN); LENOVO (BEIJING) LIMITED, Beijing (CN)

(72) Inventors: Yingjun Zhao, Beijing (CN); Xiaoting Shao, Beijing (CN); Xingping Jiang, Beijing (CN)

(73) Assignees: BEIJING LENOVO SOFTWARE, Beijing (CN); LENOVO (BEIJING) LIMITED, Beijing (CN)

( * ) Notice: Subject to any disclaimer, the term of this patent is extended or adjusted under 35 U.S.C. 154(b) by 376 days.

(21) Appl. No.: 14/730,526

(22) Filed: Jun. 4, 2015

(65) Prior Publication Data
US 2016/0192117 A1  Jun. 30, 2016

(30) Foreign Application Priority Data
Dec. 30, 2014  (CN) .......................... 2014 1 0850879

(51) Int. Cl.
*H04W 4/80* (2018.01)
*G06F 3/0488* (2013.01)

(52) U.S. Cl.
CPC ........... *H04W 4/80* (2018.02); *G06F 3/04883* (2013.01)

(58) Field of Classification Search
CPC .... H04W 4/80; G06F 3/04883; G06F 3/0488; G06F 3/048–04886
See application file for complete search history.

(56) References Cited

U.S. PATENT DOCUMENTS

2006/0146765 A1* 7/2006 Van De Sluis ......... G06F 3/016
370/338
2010/0302130 A1* 12/2010 Kikuchi ................ G06F 3/0481
345/1.3

(Continued)

FOREIGN PATENT DOCUMENTS

| CN | 102478986 A | 5/2012 |
| CN | 102945313 A | 2/2013 |
| EP | 2797299 A1 | 10/2014 |

OTHER PUBLICATIONS

Translation of abstract for Chinese application CN102478986A. 1 page.

(Continued)

*Primary Examiner* — Temesghen Ghebretinsae
*Assistant Examiner* — Ivelisse Martinez Quiles
(74) *Attorney, Agent, or Firm* — Scully Scott Murphy & Presser

(57) ABSTRACT

The present disclosure provides a data transmission method and a first electronic device. The method comprises: displaying a sharing mark on a display unit of a first electronic device; obtaining, by a sensor unit of the first electronic device, sensing parameters which indicate an input operation of an operator; determining that an operation object of the input operation is a first object displayed on the display unit based on a first parameter from the sensing parameters; determining an operation trajectory of the input operation based on a second parameter from the sensing parameters; determining that the input operation is a sharing operation associated with the first object when the operation trajectory moves towards the sharing mark; and responding to the sharing operation.

12 Claims, 5 Drawing Sheets

(56) References Cited

U.S. PATENT DOCUMENTS

| | | | | |
|---|---|---|---|---|
| 2011/0078573 A1* | 3/2011 | Ooba | G06F 9/4443 | 715/733 |
| 2011/0083111 A1* | 4/2011 | Forutanpour | G06F 1/1694 | 715/863 |
| 2011/0091183 A1* | 4/2011 | Nakamura | H04N 5/765 | 386/230 |
| 2011/0209093 A1* | 8/2011 | Hinckley | G06F 3/04817 | 715/834 |
| 2012/0036434 A1* | 2/2012 | Oberstein | G06F 3/0482 | 715/702 |
| 2012/0066602 A1* | 3/2012 | Chai | G06F 3/04817 | 715/733 |
| 2012/0139951 A1* | 6/2012 | Hwang | G06F 3/04883 | 345/665 |
| 2012/0144347 A1* | 6/2012 | Jo | G06F 3/04883 | 715/863 |
| 2012/0191832 A1* | 7/2012 | Kim | H04L 12/2812 | 709/223 |
| 2012/0262494 A1* | 10/2012 | Choi | G06F 3/0481 | 345/672 |
| 2013/0019175 A1* | 1/2013 | Kotler | G06F 3/0482 | 715/728 |
| 2013/0145287 A1* | 6/2013 | Jung | G06F 3/048 | 715/753 |
| 2014/0006949 A1* | 1/2014 | Briand | G06F 3/04817 | 715/716 |
| 2014/0040766 A1* | 2/2014 | Shigeta | H04M 1/7253 | 715/748 |
| 2014/0068469 A1* | 3/2014 | Lee | H04M 1/7253 | 715/761 |
| 2014/0082519 A1* | 3/2014 | Wang | H04M 1/72522 | 715/748 |
| 2014/0082610 A1* | 3/2014 | Wang | G06F 9/445 | 717/178 |
| 2014/0168122 A1* | 6/2014 | Jiang | G06F 3/0482 | 345/173 |
| 2014/0282728 A1* | 9/2014 | Matsunaga | G06F 3/0488 | 725/38 |
| 2014/0317530 A1* | 10/2014 | Chang | H04M 1/7253 | 715/748 |
| 2014/0320387 A1* | 10/2014 | Eriksson | G06F 3/017 | 345/156 |
| 2014/0325382 A1* | 10/2014 | Brown | G06F 3/0486 | 715/748 |
| 2014/0340283 A1* | 11/2014 | Steckley | G06F 3/14 | 345/2.1 |
| 2015/0121238 A1* | 4/2015 | Lee | H04L 67/06 | 715/738 |
| 2015/0180916 A1* | 6/2015 | Ahn | G06F 3/04845 | 715/273 |
| 2016/0110152 A1* | 4/2016 | Choi | G06F 3/04817 | 345/2.3 |
| 2016/0210016 A1* | 7/2016 | Shin | G06F 3/0488 | |
| 2017/0339299 A1* | 11/2017 | Iki | H04N 1/00973 | |

OTHER PUBLICATIONS

Translation of abstract for Chinese application CN102945131A. 1 page.

* cited by examiner

DATA TRANSMISSION METHOD AND FIRST ELECTRONIC DEVICE

TECHNICAL FIELD

The present disclosure relates to information processing technology, and more particularly, to a data transmission method and a first electronic device.

BACKGROUND

With the development of information processing technology, more and more electronic devices, such as mobile phones, tablet computers and notebook computers, are used in people's works and lives. It has become a common demand to share data between different electronic devices.

Conventionally, in order to for a first electronic device to share a first object with a second electronic device, the first electronic device first receives an object search operation from a user and determines the first object from a file management system in the first electronic device. Next, the first electronic device receives from the user an operation to search for a sharing application and determines a sharing-enabled application from an application management system in the first electronic device. Then, the first electronic device is connected to the second electronic device for sending the first object to the second electronic device by using the sharing-enabled application.

Conventionally, the user has to perform a number of operations in order to share data between the first and second electronic devices. In this case, the user operations would be troublesome since the data sharing between the electronic devices cannot be done with one single operation by the user.

SUMMARY

It is an object of the present disclosure to provide a data transmission method and a first electronic device, capable of solving the technical problem in the prior art that data sharing between electronic devices cannot be done with one single operation by a user. It is possible to share data in response to one single operation by a user. In this way, the user operation can be simplified and the user experience can be improved.

In an aspect, according to an embodiment of the present disclosure, a data transmission method is provided. The method comprises: displaying a sharing mark on a display unit of a first electronic device; obtaining, by a sensor unit of the first electronic device, sensing parameters which indicate an input operation of an operator; determining that an operation object of the input operation is a first object displayed on the display unit based on a first parameter from the sensing parameters; determining an operation trajectory of the input operation based on a second parameter from the sensing parameters; determining that the input operation is a sharing operation associated with the first object when the operation trajectory moves towards the sharing mark; and responding to the sharing operation.

Optionally, the method further comprises, subsequent to the step of determining the operation trajectory of the input operation based on the second parameter from the sensing parameters: determining that the input operation is a moving operation associated with the first object when the operation trajectory does not move towards the sharing mark; and responding to the moving operation.

Optionally, the step of responding to the sharing operation comprises: responding to the sharing operation based on a status of a smart application management module apparatus associated with the sharing mark.

Optionally, the first electronic device further comprises a communication module that enables the smart application management module apparatus to establish a communication channel with at least one second electronic device. The status of the smart application management module apparatus comprises: a first status where the smart application management module apparatus fails to establish a communication channel with at least one second electronic device, a second status where the smart application management module apparatus has established a communication channel with one second electronic device, and/or a third status where the smart application management module apparatus has established communication channels with two or more second electronic devices.

Optionally, the step of responding to the sharing operation based on the status of the smart application management module apparatus associated with the sharing mark comprises: controlling the first electronic device to cache the first object when the smart application management module apparatus is in the first status, controlling the first electronic device to transmit the first object to the one second electronic device via the established communication channel when the smart application management module apparatus is in the second status, and/or controlling the first electronic device to transmit the first object to the two or more second electronic devices via the established communication channels when the smart application management module apparatus is in the third status.

Optionally, the step of responding to the sharing operation based on the status of the smart application management module apparatus associated with the sharing mark comprises: responding to the sharing operation based on the status of the smart application management module apparatus upon determining that the input operation has ended based on a third parameter from the sensing parameters.

Optionally, the step of responding to the sharing operation based on the status of the smart application management module apparatus associated with the sharing mark comprises: displaying, upon determining that the input operation is maintained in a sharing mark area where the sharing mark is located based on a fourth parameter from the sensing parameters, a mark sub-area around the sharing mark area, the mark sub-area being used for displaying a device identifier of each second electronic device that has established a communication channel with the first electronic device; selecting a first device identifier from the device identifiers upon determining that the input operation has ended based on a fifth parameters from the sensing parameters; and controlling the first electronic device to transmit the first object to the second electronic device corresponding to the first device identifier via the established communication channel.

In another aspect, according to an embodiment of the present disclosure, a first electronic device is provided. The first electronic device comprises: a display unit configured to display a sharing mark; a sensor unit configured to obtain sensing parameters which indicate an input operation of an operator; a first determination unit configured to determine that an operation object of the input operation is a first object displayed on the display unit based on a first parameter from the sensing parameters; a second determination unit configured to determine an operation trajectory of the input operation based on a second parameter from the sensing parameters; a third determination unit configured to determine that the input operation is a sharing operation associated with the first object when the operation trajectory moves towards the sharing mark; and a first responding unit configured to respond to the sharing operation.

Optionally, the first electronic device further comprises: a fourth determination unit configured to determine, subsequent to determining the operation trajectory of the input operation based on the second parameter from the sensing parameters, that the input operation is a moving operation associated with the first object when the operation trajectory does not move towards the sharing mark; and a second responding unit configured to respond to the moving operation.

Optionally, the first responding unit is configured to: respond to the sharing operation based on a status of a smart application management module apparatus associated with the sharing mark.

Optionally, the first electronic device further comprises a communication module that enables the smart application management module apparatus to establish a communication channel with at least one second electronic device. The status of the smart application management module apparatus comprises: a first status where the smart application management module apparatus fails to establish a communication channel with at least one second electronic device, a second status where the smart application management module apparatus has established a communication channel with one second electronic device, and/or a third status where the smart application management module apparatus has established communication channels with two or more second electronic devices.

Optionally, the first responding unit comprises: a first control sub-unit configured to control the first electronic device to cache the first object when the smart application management module apparatus is in the first status; a second control sub-unit configured to control the first electronic device to transmit the first object to the one second electronic device via the established communication channel when the smart application management module apparatus is in the second status; and/or a third control sub-unit configured to control the first electronic device to transmit the first object to the two or more second electronic devices via the established communication channels when the smart application management module apparatus is in the third status.

Optionally, the first responding unit is configured to: respond to the sharing operation based on the status of the smart application management module apparatus upon determining that the input operation has ended based on a third parameter from the sensing parameters.

Optionally, the first responding unit comprises: a first determination sub-unit configured to display, upon determining that the input operation is maintained in a sharing mark area where the sharing mark is located based on a fourth parameter from the sensing parameters, a mark sub-area around the sharing mark area, the mark sub-area being used for displaying a device identifier of each second electronic device that has established a communication channel with the first electronic device; a second determination sub-unit configured to select a first device identifier from the device identifiers upon determining that the input operation has ended based on a fifth parameters from the sensing parameters; and a third determination sub-unit configured to control the first electronic device to transmit the first object to the second electronic device corresponding to the first device identifier via the established communication channel.

BRIEF DESCRIPTION OF THE DRAWINGS

In order to illustrate the solutions according to the embodiments of the present disclosure or the prior art clearly, the figures used for description of the embodiments or the prior art will be introduced briefly here. It is apparent to those skilled in the art that the figures described below only illustrate some embodiments of the present disclosure and other figures can be obtained from these figures without applying any inventive skills.

DETAILED DESCRIPTION OF THE EMBODIMENTS

The present disclosure provides a data transmission method and a first electronic device, capable of solving the technical problem in the prior art that data sharing between electronic devices cannot be done with one single operation by a user. It is possible to share data in response to one single operation by a user. In this way, the user operation can be simplified and the user experience can be improved.

With the embodiments of the present disclosure, first a sharing mark is displayed on a display unit of a first electronic device and a sensor unit of the first electronic device obtains sensing parameters which indicate an input operation of an operator. Then, it is determined that an operation object of the input operation is a first object displayed on the display unit based on a first parameter from the sensing parameters and an operation trajectory of the input operation is determined based on a second parameter from the sensing parameters. Finally, when the operation trajectory moves towards the sharing mark, it is determined that the input operation is a sharing operation associated with the first object and the sharing operation is responded to.

That is, as long as the user performs an input operation having an operation trajectory moving towards the sharing mark displayed on the display unit of the first electronic device, the input operation can be determined as a sharing operation associated with a first object to which the input operation is applied and the sharing operation can then be responded to. Accordingly, the embodiments of the present disclosure can solve the technical problem in the prior art that data sharing between electronic devices cannot be done with one single operation by the user. It is possible to share data in response to one single operation by a user. In this way, the user operation can be simplified and the user experience can be improved.

In the following, the embodiments of the present disclosure will be described in further detail with reference to the figures, such that the objects, solutions and advantages of the present disclosure will become more apparent. Obviously, the embodiments described below are only some, rather than all, of the embodiments. Starting from the embodiments of the present disclosure, those skilled in the art can obtain other embodiments with applying any inventive skills. All these embodiments are to be encompassed by the scope of the present disclosure.

Further, the term "and/or" as used herein only represents a relationship between correlated objects, including three possibilities. For example, "A and/or B" means A, B, or both. In addition, unless indicated otherwise, the symbol "/" as used herein represents an "or" relationship between the correlated objects preceding and succeeding the symbol.

In the following, the embodiments of the present disclosure will be described in further detail with reference to the figures.

Figure 1:
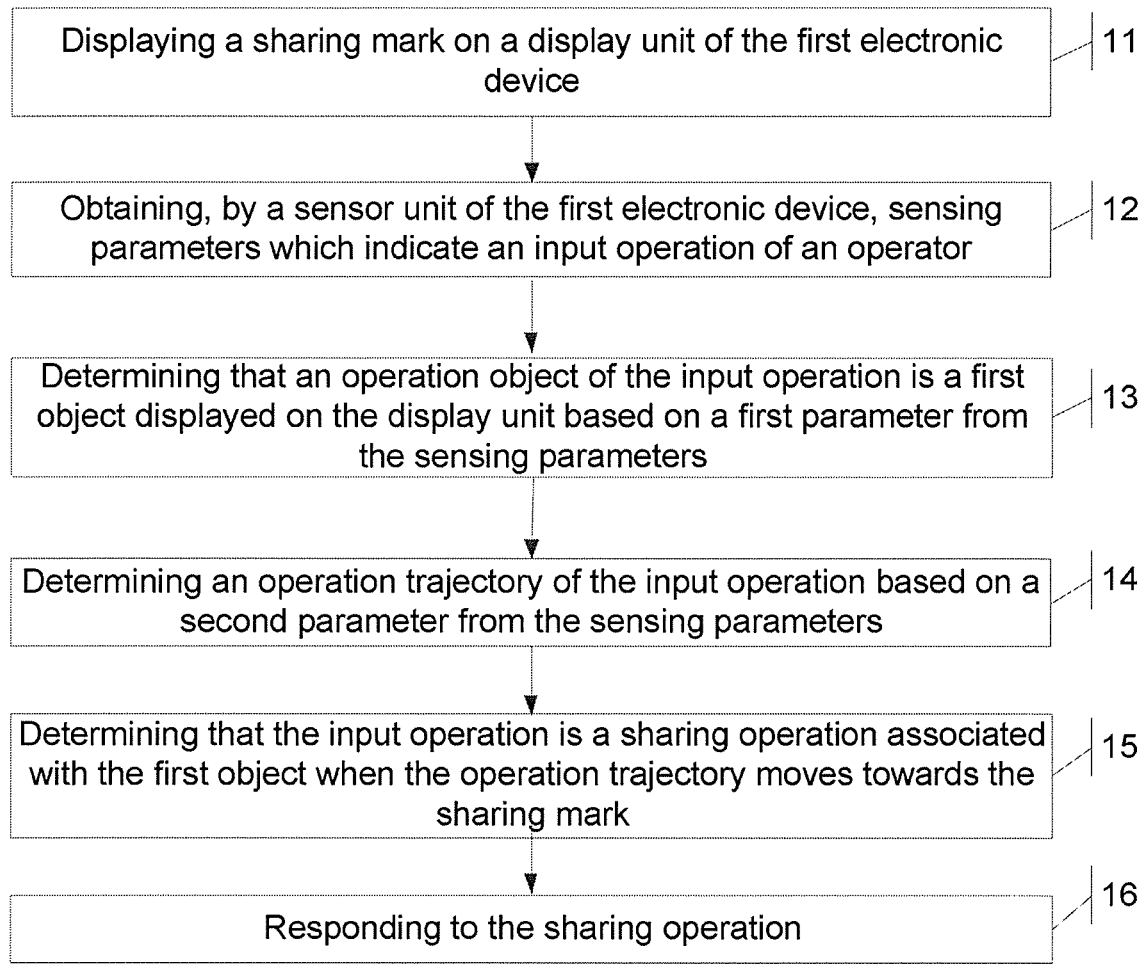
FIG. 1 is a flowchart illustrating a data transmission method according to an embodiment of the present disclosure.

According to an embodiment of the present disclosure, a data transmission method is provided. The method is applied in a first electronic device, which can be a mobile phone, a tablet computer or a notebook computer. Referring to FIG. 1, which is a flowchart illustrating a data transmission method according to an embodiment of the present disclosure, the data transmission method includes the following steps.

At step 11, a sharing mark is displayed on a display unit of the first electronic device.

At step 12, a sensor unit of the first electronic device obtains sensing parameters which indicate an input operation of an operator.

At step 13, it is determined that an operation object of the input operation is a first object displayed on the display unit based on a first parameter from the sensing parameters.

At step 14, an operation trajectory of the input operation is determined based on a second parameter from the sensing parameters.

At step 15, it is determined that the input operation is a sharing operation associated with the first object when the operation trajectory moves towards the sharing mark.

At step 16, the sharing operation is responded to.

Figure 2A:
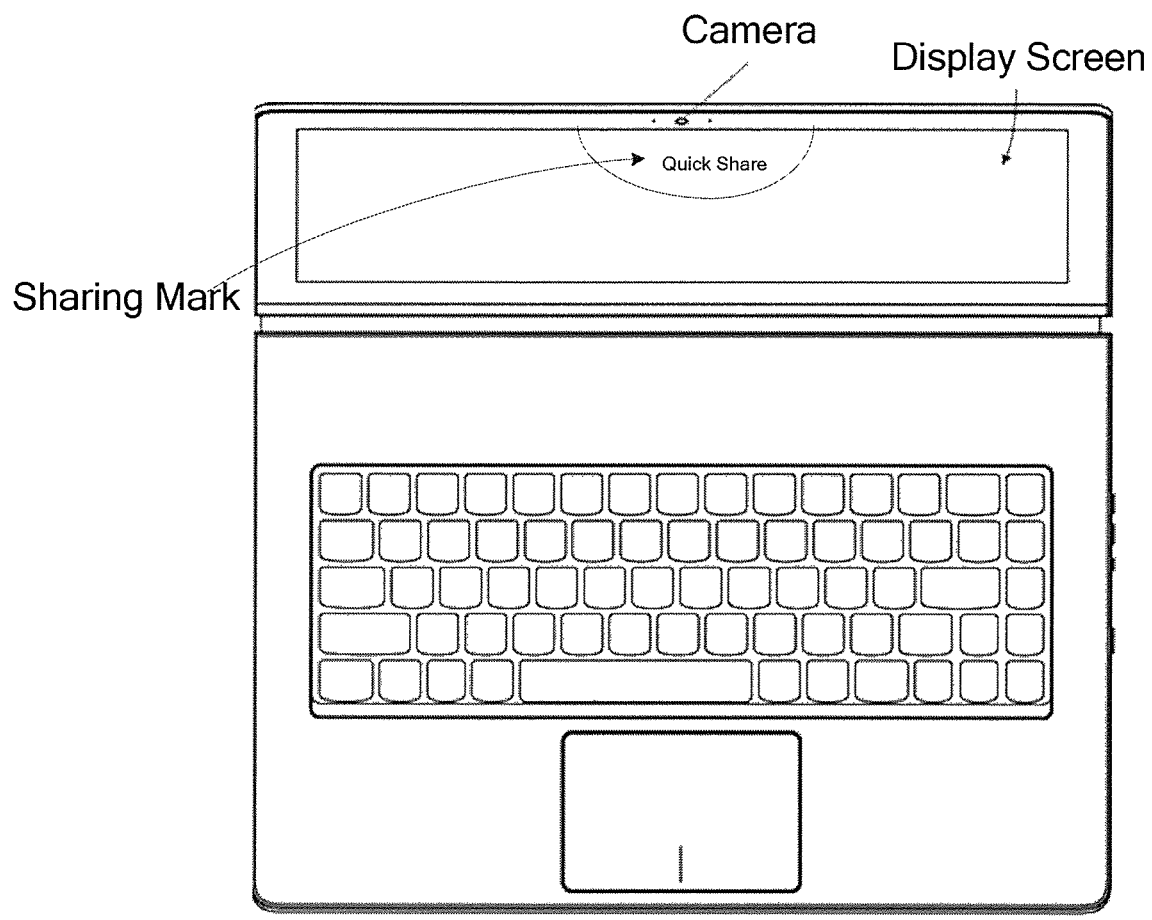
FIGS. 2A and 2B are schematic diagrams each showing a sharing mark displayed on a display unit of a first electronic device according to an embodiment of the present disclosure.
Figure 2B:
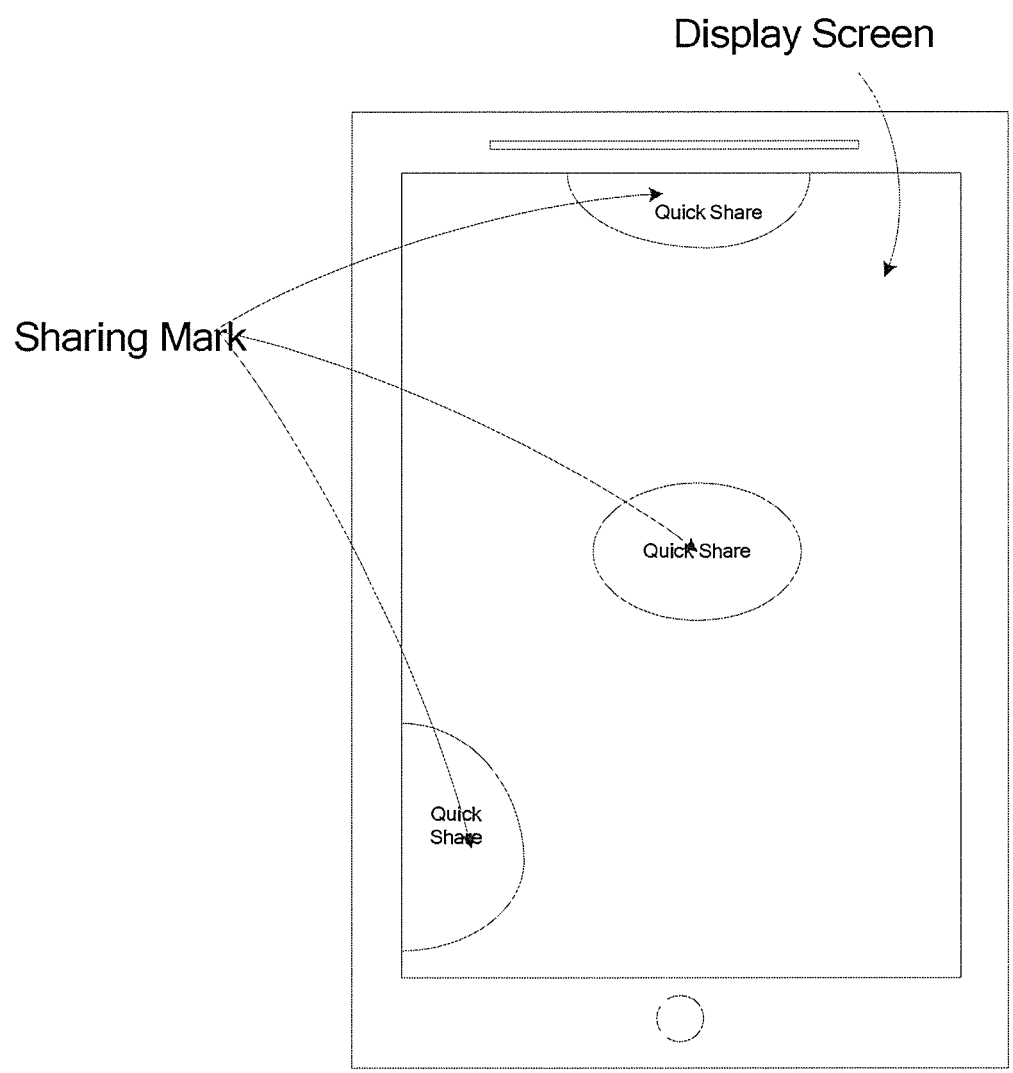

In an embodiment of the present disclosure, a sharing mark can be an icon and can be displayed anywhere on the display unit. Reference can be made to FIGS. 2A and 2B, which are schematic diagrams each showing the sharing mark displayed on the display unit of the first electronic device according to an embodiment of the present disclosure. As shown in FIG. 2A, the sharing mark can be displayed at a first position on the display unit of the first electronic device, which can be a position on the display unit close to a camera of the first electronic device. In the example shown in FIG. 2A, the electronic device is a notebook computer and a camera is provided at the center of a side of the electronic device. A triggering button is provided vertically in-line with the camera, also at the center of a side of the electronic device. In the example shown in FIG. 2B, the electronic device is a mobile phone and the sharing mark can be displayed at the center of the display unit or at somewhere close to a side of the display unit.

In an embodiment of the present disclosure, the first electronic device is further provided with a sensor unit. The sensor unit can be a touch sensitive sensor unit, which can be combined with the display unit to form a capacitive or resistive touch sensitive screen. When the user touches the capacitive or resistive touch sensitive screen, the touch sensitive sensor can detect a variation in a capacitance or resistance value as caused by the touch. Alternatively, the sensor unit can be a pressure sensor provided beneath the display unit. When the user presses the display unit, the pressure sensor can detect a pressure caused by the pressing. In the case where the sharing mark is displayed on the display unit, the sensor unit can obtain sensing parameters which indicate an input operation of an operator. Here the operator can be a finger of the user or a stylus.

For example, a capacitive touch sensitive screen can have a first capacitance value when no operator touches it and a second capacitance value when an operator touches it. The first electronic device can obtain the input operation by the operator based on the variation in the capacitance value.

In an embodiment of the present disclosure, the sensing parameters obtained by the sensor unit include a first parameter and a second parameter. Based on a first parameter, it can be determined that an operation object of the input operation is a first object displayed on the display unit. Based on the second parameter, an operation trajectory of the input operation can be determined.

In particular, when one or more objects are displayed on the display unit of the first electronic device, each object has its unique coordinate position on the display unit. When the operator performs the input operation on the display unit, the sensor unit of the first electronic device will obtain a number of sensing parameters in sequence. The sensing parameter obtained initially by the sensor unit at the beginning of the input operation is the first parameter and the object located at the coordinate position corresponding to the first parameter is the first object. These sensing parameters correspond to different coordinate positions, which constitute an operation trajectory of the input operation.

For example, when the user performs an input operation on a capacitive touch sensitive screen of a tablet computer with his/her finger, the touch sensitive screen of the tablet computer will obtain a number of different capacitance values in sequence. The input operation generally starts with the finger touching the touch sensitive screen. The touch sensitive screen can obtain a first, changed capacitance value when it is touched by the finger. The object at the coordinate position corresponding to the first capacitance value is the first object. A trajectory constituted by those different capacitance values is the operation trajectory of the input operation.

After the operation trajectory of the input operation has been determined, two implementations are provided according to the embodiment of the present disclosure based on the direction of the operation trajectory.

In a first implementation, when the operation trajectory moves towards the sharing mark, it is determined that the input operation is a sharing operation associated with the first object and the sharing operation is responded to.

In a second implementation, when the operation trajectory does not move towards the sharing mark, it is determined that the input operation is a moving operation associated with the first object and the moving operation is responded to.

Here, the direction of the operation trajectory can be determined by connecting the coordinate positions corresponding to the sensing parameters obtained by the sensor unit sequentially while the operator is performing the input operation on the display unit, starting from the coordinate position where the first object is located and ending at the coordinate position corresponding to the sensing parameter obtained by the sensor unit at the end of the input operation. In this way, a directional operation trajectory can be obtained.

In an embodiment of the present disclosure, there are several scenarios where the operation trajectory moves towards the sharing mark.

In a first scenario, the sharing mark can be located anywhere on the display unit and any operation trajectory pointing to the sharing mark can be determined as moving towards the sharing mark.

In a second scenario, the sharing mark can be located at an edge of the display unit and any operation trajectory pointing to that edge can be determined as moving towards the sharing mark.

In a third scenario, the sharing mark is located at a first position on the display unit of the first electronic device, which is close to the camera of the first electronic device, and any operation trajectory pointing to the camera can be determined as moving towards the sharing mark.

In an embodiment of the present disclosure, when the operation trajectory of the input operation moves towards the sharing mark, the first electronic device determines that the input operation is a sharing operation associated with the first object and responds to the sharing operation by transmitting the first object to another electronic device. When the operation trajectory of the input operation does not move towards the sharing mark, the first electronic device determines that the input operation is a moving operation associated with the first object and responds to the moving operation by moving the first object to another position on the display unit.

Accordingly, as long as the user selects an object on the display unit and drags it towards the sharing mark, the first electronic device can automatically recognize that the user wants to share the object and then share it with another electronic device. When the user selects an object on the display unit and drags it towards somewhere other than the sharing mark, the first electronic device can automatically recognize that the user wants to move the object and move it to another position on the display unit. That is, different functions can be achieved by recognizing gestures of various input operations, which makes the input operations more natural and convenient and improves the user experience.

In an embodiment of the present disclosure, the first electronic device further includes a communication module that enables the smart application management module apparatus to establish a communication channel with at least one second electronic device. The status of the smart application management module apparatus includes: a first status where the smart application management module apparatus fails to establish a communication channel with at least one second electronic device, a second status where the smart application management module apparatus has established a communication channel with one second electronic device, and/or a third status where the smart application management module apparatus has established communication channels with two or more second electronic devices.

In particular, the sharing mark can be associated with the smart application management module apparatus which enables the data sharing function corresponding to the sharing mark. The first electronic device can have a communication module, via which the smart application management module apparatus can establish a connection with a second electronic device that can be a mobile phone, tablet computer, notebook computer or network server (cloud). Various transmission protocols, such as 3G, wireless or Bluetooth, can be adopted between the first and second electronic devices.

The embodiment of the present disclosure is not limited to any specific timing at which the communication connection is established between the smart application management module apparatus and the second electronic device via the communication module of the first electronic device. The smart application management module apparatus can establish a connection with the second electronic device via the communication module before the first electronic device determines the input operation as the sharing operation and transmit the operation object of the input operation to the second electronic device in response to the sharing operation. Alternatively, after the first electronic device has determined the input operation as the sharing operation, the smart application management module apparatus can first establish a connection with the second electronic device via the communication module and then transmit the operation object of the input operation to the second electronic device in response to the sharing operation.

Depending on the connection establishment between the first and second electronic devices, the smart application management module apparatus may have the following three statuses: a first status where the first electronic device fails to establish a communication channel with the second electronic device, a second status where the first electronic device has established a communication channel with one second electronic device, and/or a third status where the first electronic device has established communication channels with two or more second electronic devices.

In practice, it is possible that the first electronic device is located within coverage of a WiFi signal while the second electronic device is not, or one second electronic device is located within the coverage of the WiFi signal, or two or more second electronic devices are located within the coverage of the WiFi signal.

Alternatively, the first electronic device can be connected to the Internet and serve as a hot spot, or Access Point (AP) to create a wireless network while the second electronic device is not located within the coverage of the wireless network created by the first electronic device, or one second electronic device is located within the coverage of the wireless network, or two or more second electronic devices are located within the coverage of the wireless network.

Alternatively, the first electronic device can have a Near Field Communication (NFC) function while the second electronic device is away from the first electronic device and is not located within the coverage of the NFC, or one second electronic device is located within the coverage of the NFC, or two or more second electronic devices are located within the coverage of the NFC.

Alternatively, the first electronic device may enable its Bluetooth module while the second electronic device may not enable its Bluetooth module, or may enable its Bluetooth module but fail to be paired with the first electronic device successfully, or one second electronic device may enable its Bluetooth module and succeed to be paired with the first electronic device, or two or more second electronic devices enable their Bluetooth modules and succeed to be paired with the first electronic device.

In an embodiment of the present disclosure, the sharing mark may have different display effects when the smart application management module apparatus is in different statuses. For example, when the smart application management module apparatus is in the first status where it fails to establish a connection with the second electronic device, the sharing mark can be displayed in gray. When the smart application management module apparatus is in the second status where it has established a connection with one second electronic device, the sharing mark can be displayed partially in gray and partially in blue. When the smart application management module apparatus is in the third status where it has established connections with two or more second electronic devices, the sharing mark can be displayed partially in gray and partially in blue, or entirely blue. The portion of the sharing mark that is displayed in blue can be increased as the number of connected second electronic devices increases. Of course, the number of currently connected second electronic devices can be displayed on the sharing mark. By viewing the display effect of the sharing mark, the user can determine whether the first electronic device is currently connected with the second electronic device and, if so, how many second electronic devices are connected with the first electronic device.

In an embodiment of the present disclosure, the step 16 includes responding to the sharing operation based on a status of a smart application management module apparatus associated with the sharing mark, which includes: controlling the first electronic device to cache the first object when the smart application management module apparatus is in the first status, controlling the first electronic device to transmit the first object to the one second electronic device via the established communication channel when the smart application management module apparatus is in the second status, and/or controlling the first electronic device to transmit the first object to the two or more second electronic devices via the respective established communication channels when the smart application management module apparatus is in the third status.

In particular, when the smart application management module apparatus is in the first status where it fails to establish a connection with the second electronic device, the operation object of the input operation, i.e., the first object, is cached in response to the sharing operation. The first object can be switched from being displayed on the display unit to being hidden. After the communication connection has been established between the first and second electronic devices, the first electronic device can automatically transmit the cached first object to the second electronic device.

When the smart application management module apparatus is in the second status where it has established a communication channel with one second electronic device, the operation object of the input operation, i.e., the first object, is transmitted to the second electronic device via the communication channel in response to the sharing operation.

When the smart application management module apparatus is in the third status where it has established communication channels with two or more second electronic devices, the operation object of the input operation, i.e., the first object, is transmitted to the two or more second electronic devices simultaneously via the communication channels in response to the sharing operation.

In an embodiment of the present disclosure, the step of responding to the sharing operation based on the status of the smart application management module apparatus associated with the sharing mark includes responding to the sharing operation based on the status of the smart application management module apparatus upon determining that the input operation has ended based on a third parameter from the sensing parameters.

The embodiment of the present disclosure is not limited to any specific timing at which the communication connection is established between the smart application management module apparatus and the second electronic device via the communication module of the first electronic device. The smart application management module apparatus may establish a connection with the second electronic device via the communication module before the first electronic device determines the input operation as the sharing operation. Hence, before the first electronic device determines the input operation as the sharing operation, the first electronic device may have not established a connection with the second electronic device, or may have established a connection with one second electronic device, or may have established connections with two or more second electronic devices. When the first electronic device determines the input operation as the sharing operation and responds to the sharing operation, as the network environment varies, a second electronic device that had not been connected with the first electronic device may have established a connection with the first electronic device, or a second electronic device that had been connected with the first electronic device may have been disconnected from the first electronic device. If in this case the operation object of the input operation, i.e., the first object, is still transmitted to the second electronic device, it is possible that the transmission would fail due to the disconnection or fail to reach the second electronic device that has been newly connected. Thus, in an embodiment of the present disclosure, when it is determined that the input operation has ended based on the third parameter from the sensing parameters, the status of the smart application management module apparatus will be acquired to respond to the sharing operation based on the status of the smart application management module apparatus.

Here, the third parameter is a sensing parameter obtained by the sensor unit at the end of the input operation, i.e., the last changed parameter as obtained by the sensor unit during the input operation by the operator. For example, when the user performs an input operation on a capacitive touch sensitive screen of a tablet computer with his/her finger, the touch sensitive screen of the tablet computer will obtain a number of different capacitance values in sequence. The input operation generally ends with the finger leaving the touch sensitive screen. The touch sensitive screen can obtain the last changed capacitance value, i.e., the third parameter, when the finger leaves it.

In particular, in the case where the smart application management module apparatus has established a connection with the second electronic device via the communication module before the first electronic device determines the input operation as the sharing operation, the status of the smart application management module apparatus may be any of the first, second and third statuses. When it is determined based on the third parameter that the input operation has ended, the status of the smart application management module apparatus may have changed, e.g., from the first status to the second or third status, or from the second status to the first or third status, or from the third status to the first or second status. Therefore, in this case the first electronic device will acquire the status of the smart application management module apparatus, determine which second electronic device/devices is/are connected to the first electronic device based on the acquired status of the smart application management module apparatus, and then transmit the operation object of the input operation, i.e., the first object, to the second electronic device(s) connected with the first electronic device.

In the case where the smart application management module apparatus establishes a connection with the second electronic device via the communication module after the first electronic device has determined the input operation as the sharing operation and during the responding to the sharing operation, the smart application management module apparatus establishes a connection with the second electronic device via the communication module upon determining that the input operation has ended based on the third parameter. The status of the smart application management module apparatus may be any of the first, second and third statuses. The first electronic device acquires the status of the smart application management module apparatus, determines which second electronic device/devices is/are connected to the first electronic device based on the acquired status of the smart application management module apparatus, and then transmits the operation object of the input operation, i.e., the first object, to the second electronic device(s) connected with the first electronic device.

In an embodiment of the present disclosure, the step of responding to the sharing operation based on the status of the smart application management module apparatus associated with the sharing mark includes: displaying, upon determining that the input operation is maintained in a sharing mark area where the sharing mark is located based on a fourth parameter from the sensing parameters, a mark sub-area around the sharing mark area, the mark sub-area being used for displaying a device identifier of each second electronic device that has established a communication channel with the first electronic device; selecting a first device identifier from the device identifiers upon determining that the input operation has ended based on a fifth parameters from the sensing parameters; and controlling the first electronic device to transmit the first object to the second electronic device corresponding to the first device identifier via the established communication channel.

Here, the fourth parameter is a sensing parameter obtained by the sensor unit and having a constant magnitude for a predetermined time period during which the operator is maintained in a sharing mark area where the sharing mark is located while it is performing the input operation on the display unit. The coordinate position corresponding to the sensing parameter is the coordinate position of the sharing mark area where the sharing mark is located. For example, when the user performs an input operation on a capacitive touch sensitive screen of a tablet computer with his/her finger and the finger is maintained in the sharing mark area where the sharing mark is located on the capacitive touch sensitive screen, the touch sensitive screen of the tablet computer can obtain a number of changed capacitance values having the same magnitude sequentially in a predetermined time period. These changed capacitance values having the same magnitude are the fourth parameter.

Figure 3:
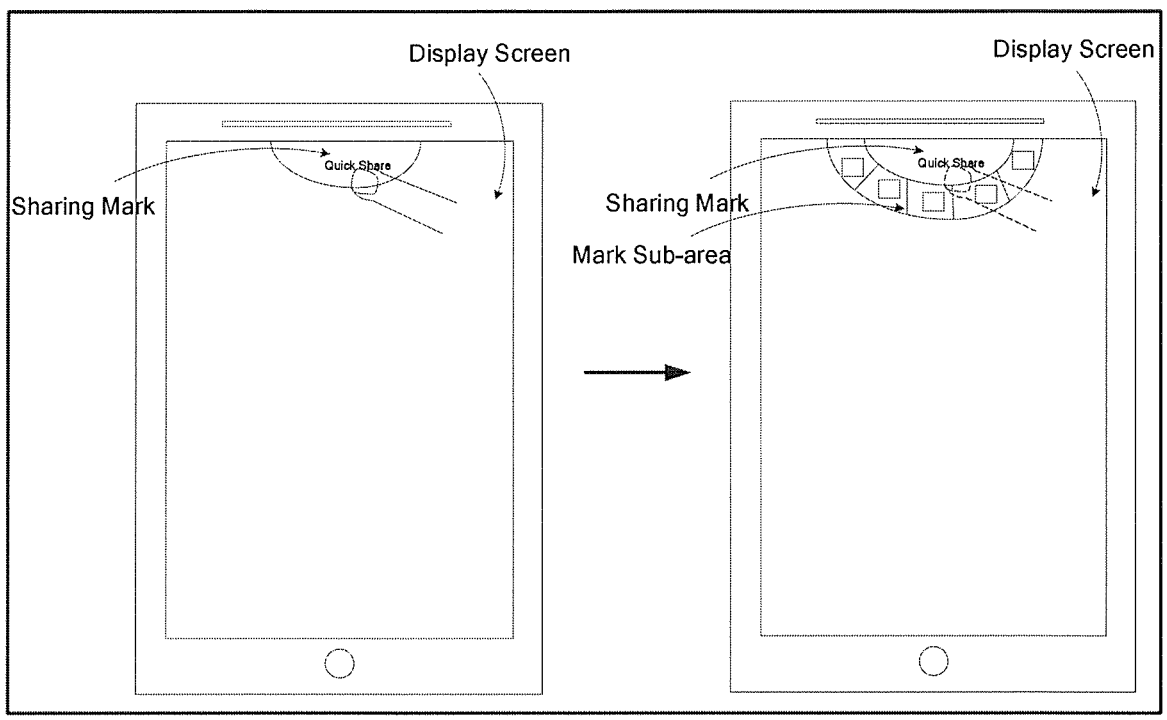
FIG. 3 is a schematic diagram showing a mark sub-area displayed on a display unit according to an embodiment of the present disclosure.

Referring to FIG. 3, which is a schematic diagram showing a mark sub-area displayed on a display unit according to an embodiment of the present disclosure, upon determining that the input operation is maintained in a sharing mark area where the sharing mark is located, the first electronic device displays a mark sub-area around the sharing mark area, which is used for displaying a device identifier of each second electronic device that has established a communication channel with the first electronic device.

The input operation has not ended after the mark sub-area is displayed on the display unit. The sensor unit can obtain a fifth parameter which is a sensing parameter obtained by the sensor unit at the end of the input operation, i.e., the last changed parameter obtained by the sensor unit while the operator is performing the input operation. Unlike the third parameter, a first device identifier from the device identifiers, i.e., a device identifier of one of the second electronic devices that have established communication channels with the first electronic device, is displayed at the coordinate position corresponding to the fifth parameter. For example, when the user performs an input operation on a capacitive touch sensitive screen of a tablet computer with his/her finger, the mark sub-area will be displayed on the touch sensitive display unit and the touch sensitive screen of the tablet computer can obtain a number of different capacitance values sequentially. The input operation generally ends with the finger leaving the touch sensitive screen. The touch sensitive screen can obtain the last changed capacitance value when the finger leaves it. The first device identifier is displayed at the coordinate position corresponding to the last capacitance value, i.e., the fifth parameter.

As the first device identifier has been selected by the input operation from the device identifiers, the first electronic device responds to the input operation by transmitting the operation object of the input operation, i.e., the first object, to the second electronic device corresponding to the first device identifier.

Figure 4:
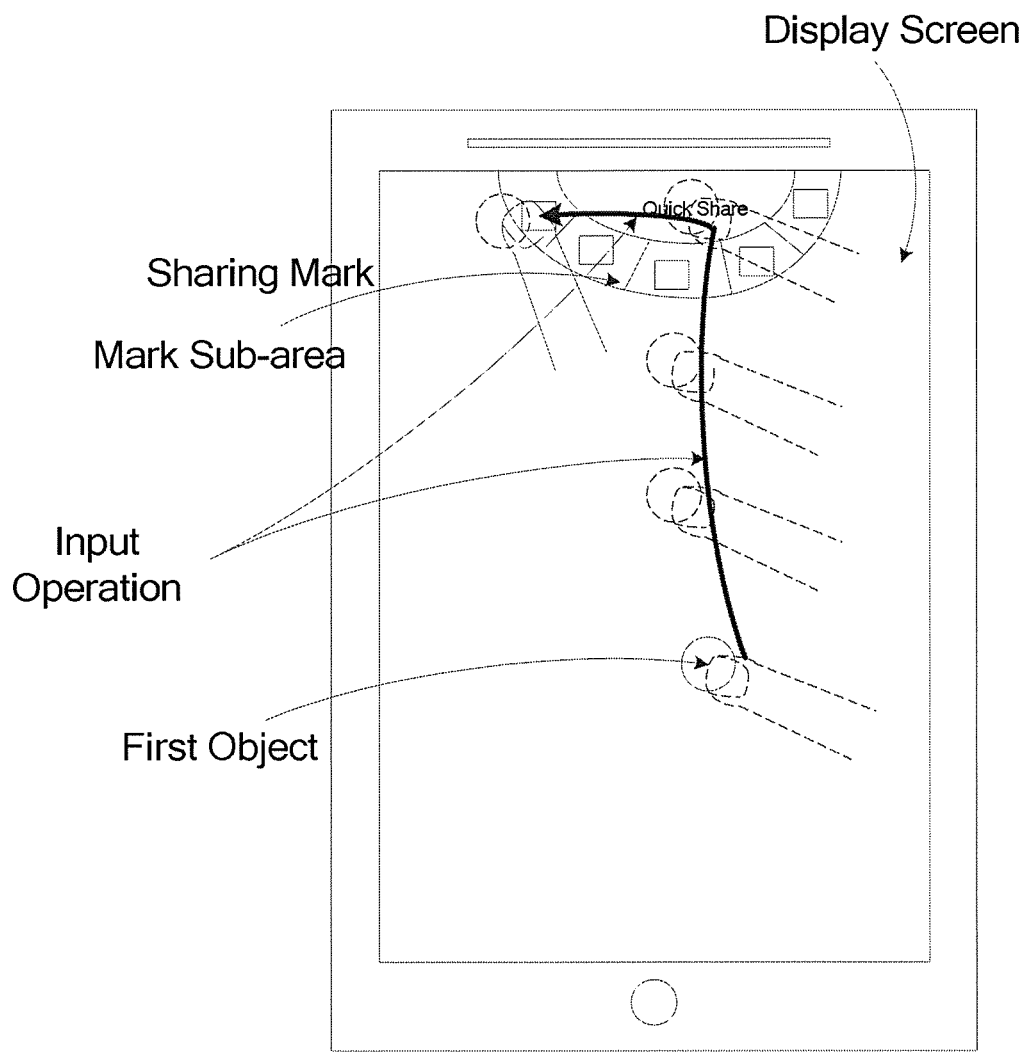
FIG. 4 is a schematic diagram showing how to respond to a sharing operation according to an embodiment of the present disclosure.

Reference is now made to FIG. 4, which is a schematic diagram showing how to respond to a sharing operation according to an embodiment of the present disclosure. As shown in FIG. 4, the operator applies an input operation to an object displayed on the display unit. First, it selects a first object on the display unit. The input operation has not ended after selecting the first object, but drags the first object towards the sharing mark area where the sharing mark is located. The first electronic device recognizes the input operation as a sharing operation. The input operation has not ended, but drags the first object into the sharing mark area and is maintained in the mark sharing area. In this case, a mark sub-area will be displayed around the sharing mark area on the display unit. A device identifier of each second electronic device that has established a communication channel with the first electronic device is displayed in the mark sub-area. The input operation has not ended after the device identifiers have been displayed on the display unit, but continues dragging the first object onto a first device identifier from the device identifiers, where the input operation ends. The first electronic device then responds to the input operation by transmitting the first object to the second electronic device corresponding to the first device identifier.

Figure 5:
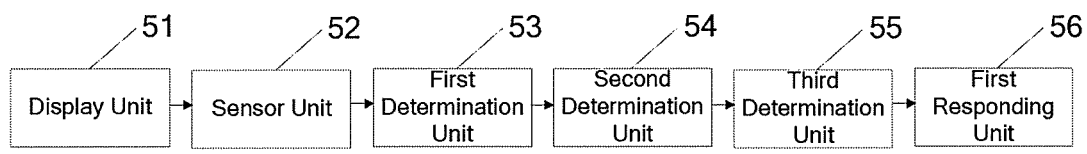
FIG. 5 is a block diagram of a first electronic device according to an embodiment of the present disclosure.

Based on the same inventive concept, a first electronic device is also provided according to an embodiment of the present disclosure. Referring to FIG. 5, which is a block diagram of a first electronic device according to an embodiment of the present disclosure, the first electronic device includes: a display unit 51 configured to display a sharing mark; a sensor unit 52 configured to obtain sensing parameters which indicate an input operation of an operator; a first determination unit 53 configured to determine that an operation object of the input operation is a first object displayed on the display unit based on a first parameter from the sensing parameters; a second determination unit 54 configured to determine an operation trajectory of the input operation based on a second parameter from the sensing parameters; a third determination unit 55 configured to determine that the input operation is a sharing operation associated with the first object when the operation trajectory moves towards the sharing mark; and a first responding unit 56 configured to respond to the sharing operation.

Optionally, the first electronic device further includes: a fourth determination unit configured to determine, subsequent to determining the operation trajectory of the input operation based on the second parameter from the sensing parameters, that the input operation is a moving operation associated with the first object when the operation trajectory does not move towards the sharing mark; and a second responding unit configured to respond to the moving operation.

Optionally, the first responding unit is configured to: respond to the sharing operation based on a status of a smart application management module apparatus associated with the sharing mark.

Optionally, the first electronic device further includes a communication module that enables the smart application management module apparatus to establish a communication channel with at least one second electronic device. The status of the smart application management module apparatus comprises: a first status where the smart application management module apparatus fails to establish a communication channel with at least one second electronic device, a second status where the smart application management module apparatus has established a communication channel with one second electronic device, and/or a third status where the smart application management module apparatus has established communication channels with two or more second electronic devices.

Optionally, the first responding unit comprises: a first control sub-unit configured to control the first electronic device to cache the first object when the smart application management module apparatus is in the first status; a second control sub-unit configured to control the first electronic device to transmit the first object to the one second electronic device via the established communication channel when the smart application management module apparatus is in the second status; and/or a third control sub-unit configured to control the first electronic device to transmit the first object to the two or more second electronic devices via the established communication channels when the smart application management module apparatus is in the third status.

Optionally, the first responding unit is configured to: respond to the sharing operation based on the status of the smart application management module apparatus upon determining that the input operation has ended based on a third parameter from the sensing parameters.

Optionally, the first responding unit includes: a first determination sub-unit configured to display, upon determining that the input operation is maintained in a sharing mark area where the sharing mark is located based on a fourth parameter from the sensing parameters, a mark sub-area around the sharing mark area, the mark sub-area being used for displaying a device identifier of each second electronic device that has established a communication channel with the first electronic device; a second determination sub-unit configured to select a first device identifier from the device identifiers upon determining that the input operation has ended based on a fifth parameters from the sensing parameters; and a third determination sub-unit configured to control the first electronic device to transmit the first object to the second electronic device corresponding to the first device identifier via the established communication channel.

One or more of the solutions according to the embodiments of the present disclosure have at least the following technical effects or advantages.

With the embodiments of the present disclosure, first a sharing mark is displayed on a display unit of a first electronic device and a sensor unit of the first electronic device obtains sensing parameters which indicate an input operation of an operator. Then, it is determined that an operation object of the input operation is a first object displayed on the display unit based on a first parameter from the sensing parameters and an operation trajectory of the input operation is determined based on a second parameter from the sensing parameters. Finally, when the operation trajectory moves towards the sharing mark, it is determined that the input operation is a sharing operation associated with the first object and the sharing operation is responded to.

That is, as long as the user performs an input operation having an operation trajectory moving towards the sharing mark displayed on the display unit of the first electronic device, the input operation can be determined as a sharing operation associated with a first object to which the input operation is applied and the sharing operation can then be responded to. Accordingly, the embodiments of the present disclosure can solve the technical problem in the prior art that data sharing between electronic devices cannot be done with one single operation by the user. It is possible to share data in response to one single operation by a user. In this way, the user operation can be simplified and the user experience can be improved.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage medium (including, but not limited to, magnetic disk storage, CD-ROM, optical storage) containing computer readable program codes.

The present disclosure have been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by the computer or the processor of any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute an article of manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

In particular, the computer program instructions for implementing the data transmission method, applied in a first electronic device, according to the embodiment of the present disclosure can be stored on a storage medium such as an optical disc, a hard disk or a flash memory. The computer program instructions stored in the storage medium for implementing the data transmission method include, when read or executed by the electronic device, the following steps of: displaying a sharing mark on a display unit of the first electronic device; obtaining, by a sensor unit of the first electronic device, sensing parameters which indicate an input operation of an operator; determining that an operation object of the input operation is a first object displayed on the display unit based on a first parameter from the sensing parameters; determining an operation trajectory of the input operation based on a second parameter from the sensing parameters; determining that the input operation is a sharing operation associated with the first object when the operation trajectory moves towards the sharing mark; and responding to the sharing operation.

Optionally, the computer program instructions stored in the storage medium further include computer program instructions, when executed subsequent to the step of determining the operation trajectory of the input operation based on the second parameter from the sensing parameters, for: determining that the input operation is a moving operation associated with the first object when the operation trajectory does not move towards the sharing mark; and responding to the moving operation.

Optionally, the computer program instructions stored in the storage medium for responding to the sharing operation include computer program instructions, when executed, for: responding to the sharing operation based on a status of a smart application management module apparatus associated with the sharing mark.

Optionally, the first electronic device further comprises a communication module that enables the smart application management module apparatus to establish a communication channel with at least one second electronic device. The status of the smart application management module apparatus comprises: a first status where the smart application management module apparatus fails to establish a communication channel with at least one second electronic device, a second status where the smart application management module apparatus has established a communication channel with one second electronic device, and/or a third status where the smart application management module apparatus has established communication channels with two or more second electronic devices.

Optionally, the computer program instructions stored in the storage medium for responding to the sharing operation based on the status of the smart application management module apparatus associated with the sharing mark include computer program instructions, when executed, for: controlling the first electronic device to cache the first object when the smart application management module apparatus is in the first status, controlling the first electronic device to transmit the first object to the one second electronic device via the established communication channel when the smart application management module apparatus is in the second status, and/or controlling the first electronic device to transmit the first object to the two or more second electronic devices via the established communication channels when the smart application management module apparatus is in the third status.

Optionally, the computer program instructions stored in the storage medium for responding to the sharing operation based on the status of the smart application management module apparatus associated with the sharing mark include computer program instructions, when executed, for: responding to the sharing operation based on the status of the smart application management module apparatus upon determining that the input operation has ended based on a third parameter from the sensing parameters.

Optionally, the computer program instructions stored in the storage medium for responding to the sharing operation based on the status of the smart application management module apparatus associated with the sharing mark include computer program instructions, when executed, for: displaying, upon determining that the input operation is maintained in a sharing mark area where the sharing mark is located based on a fourth parameter from the sensing parameters, a mark sub-area around the sharing mark area, the mark sub-area being used for displaying a device identifier of each second electronic device that has established a communication channel with the first electronic device; selecting a first device identifier from the device identifiers upon determining that the input operation has ended based on a fifth parameters from the sensing parameters; and controlling the first electronic device to transmit the first object to the second electronic device corresponding to the first device identifier via the established communication channel.

While the preferred embodiments of the present disclosure have been described above, various modifications and alternatives to these embodiments can be made by those skilled in the art based on the fundamental inventive concept. Therefore, these preferred embodiments and all the modifications and alternatives falling within the scope of the present disclosure are to be encompassed by the claims as attached.

Obviously, various modifications and alternatives can be made to the present disclosure by those skilled in the art without departing from the spirit and scope of the present disclosure. Therefore, these modifications and alternatives are to be encompassed by the present disclosure if they fall within the scope of the claims and their equivalents.

What is claimed is:

1. A data transmission method, comprising:
   displaying a sharing mark on a display of a first electronic device; obtaining, by a sensor of the first electronic device,
   sensing parameters which indicate an input operation of an operator; determining that an operation object of the input operation is a first object displayed on the display based on a first parameter from the sensing parameters;
   determining an operation trajectory of the input operation based on a second parameter from the sensing parameters;
   determining that the input operation is a sharing operation associated with the first object when the operation trajectory moves towards the sharing mark; and
   responding to the sharing operation based on a status of the first electronic device associated with the sharing mark,
   wherein the status of the first electronic device comprises:
      a third status where the first electronic device has established communication channels with two or more second electronic devices, and
   wherein said responding to the sharing operation based on the status of the first electronic device associated with the sharing mark comprises:
      controlling the first electronic device to transmit the first object to the two or more second electronic devices via the established communication channels when the first electronic device is in the third status;
      displaying, upon detecting that the input operation associated with the sharing of the first object is maintained in a sharing mark area where the sharing mark is located based on a fourth parameter from the sensing parameters, a mark sub-area around the sharing mark area, the mark sub-area being used for displaying a device identifier of each of the two or more second electronic devices that has established a communication channel with the first electronic device, the fourth parameter indicating that the input operation is maintained in the sharing mark area;

selecting a first device identifier from the displayed device identifier of each of the two or more second electronic devices upon determining that the input operation has ended based on a fifth parameter from the sensing parameters; and controlling the first electronic device to transmit the first object to a second electronic device corresponding to the first device identifier via the established communication channel.

2. The method of claim 1, further comprising, subsequent to said determining the operation trajectory of the input operation based on the second parameter from the sensing parameters: determining that the input operation is a moving operation associated with the first object when the operation trajectory does not move towards the sharing mark; and responding to the moving operation.

3. The method of claim 1, wherein said responding to the sharing operation based on the status of the first electronic device associated with the sharing mark comprises: responding to the sharing operation based on the status of the first electronic device upon determining that the input operation has ended based on the fifth parameter from the sensing parameters.

4. The method of claim 1,
wherein the sharing mark has different display effects when the electronic device is in different statuses,
wherein the sharing mark is displayed in grey when the first electronic device is in the first status, the sharing mark is displayed partially in grey and partially in color when the first electronic device is in the second or third status, and
wherein a portion of the sharing mark that is displayed in color is increased as a number of connected second electronic devices increases.

5. The method of claim 1, wherein the sharing mark has different display effects when the first electronic device is in different statuses, wherein a number of connected second electronic devices is displayed on the sharing mark.

6. The method of claim 1, wherein the status of the first electronic device comprises:
a first status where the first electronic device fails to establish a communication channel with at least one second electronic device,
a second status where the first electronic device has established a communication channel with one second electronic device,
wherein said responding to the sharing operation based on the status of the first electronic device associated with the sharing mark comprises:
controlling the first electronic device to cache the first object when the first electronic device is in the first status,
controlling the first electronic device to transmit the first object to the one second electronic device via the established communication channel when the first electronic device is in the second status.

7. A first electronic device, comprising:
a display configured to display a sharing mark;
a sensor configured to obtain sensing parameters which indicate an input operation of an operator;
a processor configured to:

determine that an operation object of the input operation is a first object displayed on the display based on a first parameter from the sensing parameters;
determine an operation trajectory of the input operation based on a second parameter from the sensing parameters;
determine that the input operation is a sharing operation associated with the first object when the operation trajectory moves towards the sharing mark; and
respond to the sharing operation based on a status of the first electronic device associated with the sharing mark,
wherein the status of the first electronic device comprises:
a third status where the first electronic device has established communication channels with two or more second electronic devices, and
wherein said processor is further configured to:
control the first electronic device to transmit the first object to the two or more second electronic devices via the established communication channels when the first electronic device is in the third status, and
wherein the processor is further configured to:
display, upon detecting that the input operation associated with the sharing of the first object is maintained in a sharing mark area where the sharing mark is located based on a fourth parameter from the sensing parameters, a mark sub-area around the sharing mark area, the mark sub-area being used for displaying a device identifier of each of the two or more second electronic devices that has established a communication channel with the first electronic device, the fourth parameter indicating that the input operation is maintained in the sharing mark area;
select a first device identifier from the displayed device identifier of each of the two or more second electronic devices upon determining that the input operation has ended based on a fifth parameter from the sensing parameters; and
control the first electronic device to transmit the first object to a second electronic device corresponding to the first device identifier via the established communication channel.

8. The first electronic device of claim 7, wherein the processor is further configured to:
determine, subsequent to determining the operation trajectory of the input operation based on the second parameter from the sensing parameters, that the input operation is a moving operation associated with the first object when the operation trajectory does not move towards the sharing mark; and
respond to the moving operation.

9. The first electronic device of claim 7, wherein the processor is further configured to: respond to the sharing operation based on the status of the first electronic device upon determining that the input operation has ended based on the fifth parameter from the sensing parameters.

10. The first electronic device of claim 7, wherein the sharing mark has different display effects when the first electronic device is in different statuses, wherein the sharing mark is displayed in grey when the first electronic device is in the first status, the sharing mark is displayed partially in grey and partially in color when the first electronic device is in the second or third status, and wherein a portion of the sharing mark that is displayed in color is increased as a number of connected second electronic devices increases.

11. The first electronic device of claim 7, wherein the sharing mark has different display effects when the first electronic device is in different statuses, wherein a number of connected second electronic devices is displayed on the sharing mark.

12. The first electronic device of claim 7, wherein the status of the first electronic device comprises:
- a first status where the first electronic device fails to establish a communication channel with at least one second electronic device,
- a second status where the first electronic device has established a communication channel with one second electronic device, and wherein said processor is further configured to:
- control the first electronic device to cache the first object when the first electronic device is in the first status,
- control the first electronic device to transmit the first object to the one second electronic device via the established communication channel when the first electronic device is in the second status.

\* \* \* \* \*